(12) United States Patent
Chevallier et al.

(10) Patent No.: US 10,724,388 B2
(45) Date of Patent: Jul. 28, 2020

(54) CORROSION PROTECTION PLUG FOR FILLING AN ATTACHMENT OPENING, AND SYSTEM INCLUDING SAID PLUG

(71) Applicant: SAFRAN AIRCRAFT ENGINES, Paris (FR)

(72) Inventors: Pierrick Chevallier, Maisons-Alfort (FR); Patrick Jean-Louis Reghezza, Vaux le Penil (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 320 days.

(21) Appl. No.: 15/548,285

(22) PCT Filed: Feb. 2, 2016

(86) PCT No.: PCT/FR2016/050217
§ 371 (c)(1),
(2) Date: Aug. 2, 2017

(87) PCT Pub. No.: WO2016/124853
PCT Pub. Date: Aug. 11, 2016

(65) Prior Publication Data
US 2018/0023405 A1 Jan. 25, 2018

(30) Foreign Application Priority Data
Feb. 3, 2015 (FR) ..................... 15 50822

(51) Int. Cl.
*F16B 37/14* (2006.01)
*F01D 9/04* (2006.01)
(Continued)

(52) U.S. Cl.
CPC ............. *F01D 9/042* (2013.01); *F01D 5/148* (2013.01); *F01D 5/28* (2013.01); *F16B 1/0071* (2013.01);
(Continued)

(58) Field of Classification Search
USPC ............ 411/372.5, 372.6, 373; 220/284, 285
See application file for complete search history.

(56) References Cited

U.S. PATENT DOCUMENTS 2,663,451 A * 12/1953 Yarnall ................. B65D 39/00
220/805
4,355,729 A * 10/1982 Maguire ............. B65D 50/067
215/211
(Continued)

FOREIGN PATENT DOCUMENTS

DE 25 39 551 A1 3/1977
DE 101 56 876 A1 6/2003
(Continued)

OTHER PUBLICATIONS

International Search Report as issued in International Patent Application No. PCT/FR2016/050217, dated Apr. 22, 2016.

*Primary Examiner* — Gary W Estremsky
(74) *Attorney, Agent, or Firm* — Pillsbury Winthrop Shaw Pittman LLP

(57) ABSTRACT

A plug for preventing corrosion of an attachment opening, includes a bottom surface including an opening for receiving a head of a tightening device; a top surface; and a substantially cylindrical side wall extending between the bottom surface and the top surface. The side wall includes a first side area, wherein the plug is formed of a elastically deformable material and has a diameter at rest and resiliency enabling the plug to block, and be held in, a top portion of the attachment opening via resilient change in shape; and the top surface includes at least one first blind hole, the shape of which is such that, when the plug is subjected to an elastic deformation that causes a ridge to appear between the top surface and the first side area of the plug, the ridge is removed by elastic deformation of the blind hole.

10 Claims, 12 Drawing Sheets

(51) Int. Cl.
  *F16B 1/00* (2006.01)
  *F01D 5/14* (2006.01)
  *F01D 5/28* (2006.01)

(52) U.S. Cl.
  CPC .......... *F16B 37/14* (2013.01); *F05D 2260/95* (2013.01); *F05D 2300/501* (2013.01); *Y02T 50/673* (2013.01)

(56) References Cited

U.S. PATENT DOCUMENTS

| | | | | |
|---|---|---|---|---|
| 4,620,641 A | * | 11/1986 | Beer | F02N 15/00 220/284 |
| 4,696,398 A | * | 9/1987 | Steinmetz, Jr. | B65D 1/14 206/521 |
| 4,850,778 A | | 7/1989 | Clough et al. | |
| 5,480,273 A | * | 1/1996 | Jou | F16B 37/14 16/441 |
| 6,293,744 B1 | * | 9/2001 | Hempfling | F16B 33/004 411/372.5 |
| 6,769,563 B2 | * | 8/2004 | Tumlin | B65D 83/40 215/215 |
| 6,964,549 B2 | * | 11/2005 | Fallon | F16B 37/14 411/372.6 |
| 8,333,537 B2 | * | 12/2012 | Rogers | F16B 37/14 301/35.622 |
| 8,827,100 B2 | * | 9/2014 | Sewell | B65D 50/067 215/48 |
| 8,870,508 B2 | * | 10/2014 | Hsu | F16B 37/14 411/372.5 |

FOREIGN PATENT DOCUMENTS

| JP | 2006-242339 A | 9/2006 |
|---|---|---|
| JP | 2009-127729 A | 6/2009 |

* cited by examiner

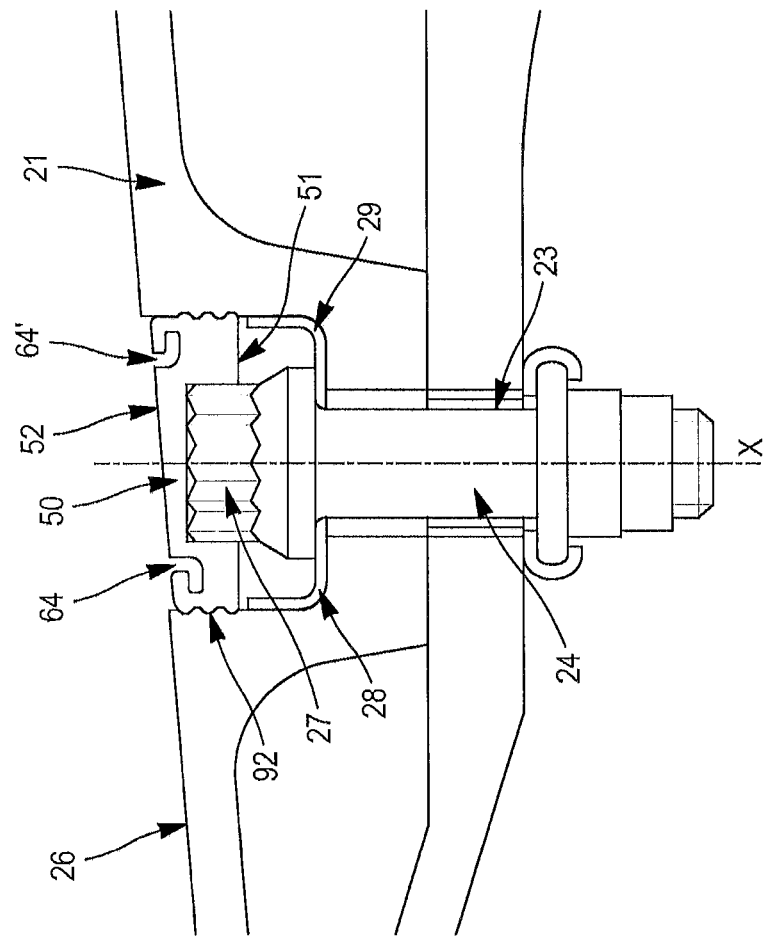
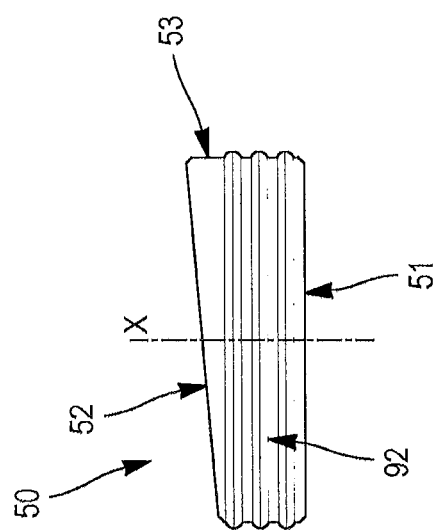
FIG. 10b
FIG. 10a

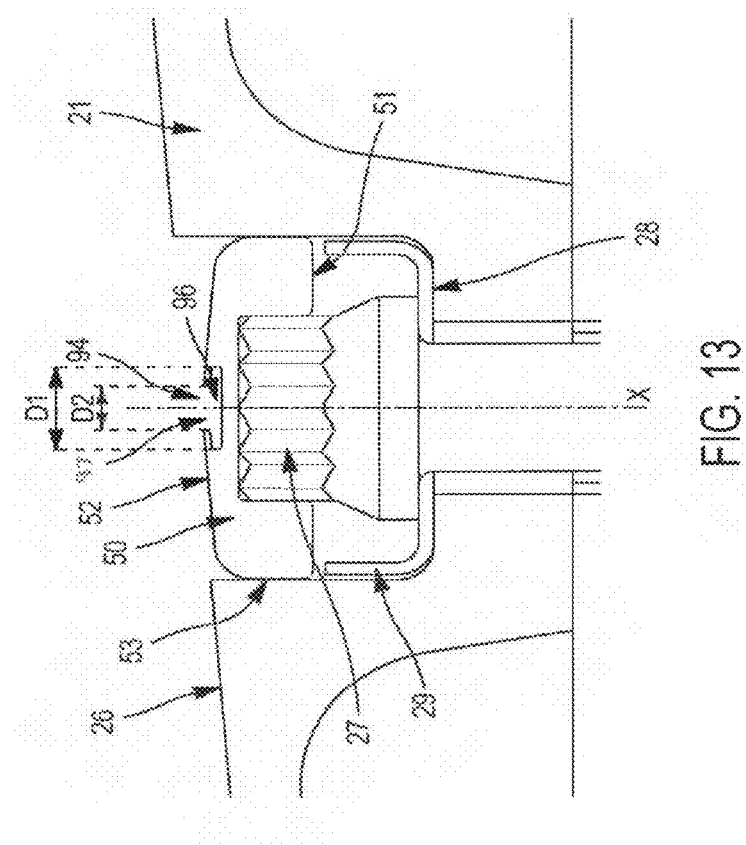
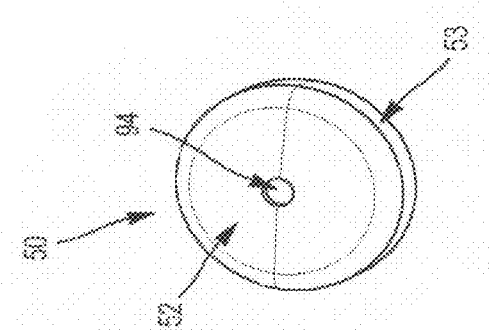

CORROSION PROTECTION PLUG FOR FILLING AN ATTACHMENT OPENING, AND SYSTEM INCLUDING SAID PLUG

CROSS-REFERENCE TO RELATED APPLICATIONS

This is the U.S. National Stage of PCT/FR2016/050217, filed Feb. 2, 2016, which in turn claims priority to French Patent Application No. 1550822, filed Feb. 3, 2015, the entire contents of all applications are incorporated herein by reference in their entireties.

TECHNICAL FIELD OF THE INVENTION

The field of the invention relates to the field of turbomachine guide vanes and more particularly to the blades of guide vanes.

TECHNOLOGICAL BACKGROUND OF THE INVENTION

A dual flow turbomachine 10 for aeronautic propulsion is represented schematically in FIG. 1. It includes a fan 11 delivering a flow of air, a central portion of which, called primary flow PF, is injected into a compressor 12 which supplies a turbine driving the fan 11.

The peripheral portion, called secondary flow SF, of the flow of air is for its part ejected to the atmosphere to provide a portion of the thrust of the turbomachine 10, after having passed through a crown of fixed blades arranged downstream of the fan 11. This crown, called guide vane 14 (also known by the acronym OGV for Outlet Guide Vane) makes it possible to straighten out the flow of air at the outlet of the fan 11 while limiting losses to the maximum.

FIG. 2a schematically illustrates a blade 20 of a guide vane 14 comprising notably a body 30 and a root 21, whereas FIG. 2b is an enlargement of the root 21 of said blade 20 along a sectional plane A-A. The blades of the guide vane 14 are intended to be fixed on a hub 15. To this end, the root 21 of the blade 20 comprises two attachment openings 22 situated on either side of the body 30, making it possible to receive tightening means for mechanically linking the blade 20 to the hub 15. An attachment opening 22 in which a tightening means 23 is positioned is represented in FIG. 3.

Each attachment opening 22 comprises:
- a bottom cylindrical portion 22a emerging at the level of a bottom surface 25 of the root 21 of the blade 20, adapted for the passage of a rod 24 of the tightening means 23,
- a top cylindrical portion 22b emerging at the level of a top surface 26 of the root 21, adapted for the passage of a head 27 of the tightening means 23,
- a shoulder 28 between the top portion 22b and the bottom portion 22a, such that the top portion 22b has a diameter Ds greater than the diameter Di of the bottom portion 22a.

Moreover, a ring or cup 29 is intended to be positioned in the top portion 22b between the head 27 of the tightening means 23 and the shoulder 28, in the manner represented in FIG. 3. The cup 29 makes it possible to avoid matting or marking the shoulder 28 by the tightening means 23.

Yet, corrosion has been observed at the level of the attachment openings 22, which is explained by the presence of stagnant water in the top portions 22b of said attachment openings 22.

A first solution to this problem consists in re-forming the attachment openings, then potentially putting in place sockets in said attachment openings. However, once these repairs have been made, water can again stagnate in the top portions of the attachment openings and thus again cause corrosion of the attachment openings. In addition, the successive repairs end up in weakening the blade root, which impacts its lifetime.

A second solution consists in filling the top portions of the attachment openings (once the blade is in position on the hub) by a silicone based compound known by the acronym RTV "Room Temperature Vulcanizing" silicone in order to block up said attachment openings. Yet the use of this silicone based compound necessitates a long drying time and consequently causes an increase in the duration of mounting operations. The use of silicone for filling the attachment openings also increases the dismantling time, notably during maintenance operations because it is necessary to remove the compound and to clean the attachment openings before re-mounting.

A third solution is described in the patent application FR no 1454953. According to this third solution, and with reference to FIGS. 4a and 4b, seals 31 are used for filling the top portions 22b of the attachment openings 22 after mounting the blades 20 of a guide vane 14 on the hub 15. A seal 31 comprises a plug 32 and a suitable cup 35. The head of the tightening means is intended to be placed in the cup 35 and to be covered by the plug 32. Furthermore, the cup 35 is intended to be held fixed in the attachment opening 22 through assembly pins 36. A port 34 made on a side wall of the cup 35 makes it possible to guide the plug 32 by fitting together and sliding of a projecting portion 33 of the plug 32 into the port 34. This male-female system makes it possible to assure the correct positioning of the plug 32 in the attachment opening 22.

Such a seal has however drawbacks:
- it is necessary to modify the cups normally used, by forming ports in said cups, and by equipping them with assembly pins,
- it is necessary to carry out two piercing at the level of the bottom portion of the attachment opening, so as to maintain the cup in the top portion of the attachment opening through assembly pins,
- the contact surface between the plug and the external diameter of the attachment opening is small, which enables water to infiltrate around the plug and may cause a disengagement of the plug during the operation of the turbomachine.

GENERAL DESCRIPTION OF THE INVENTION

In this context, the invention aims to provide a solution to avoid the corrosion of an attachment opening of a guide vane blade root, which is simple and rapid to implement, and not necessitating modification of the attachment opening or the cup.

According to a first aspect, the invention thus relates to a plug for preventing the corrosion of an attachment opening, comprising:
- a bottom surface including an opening for receiving a head of a tightening means,
- a top surface,
- a substantially cylindrical side wall extending along an axial direction between the bottom surface and the top surface, said side wall 25 including a first side area.

Moreover, the plug is formed of an elastically deformable material, and has a diameter at rest and an elasticity enabling said plug to block and to be held in the attachment opening by elastic deformation.

Moreover, the top surface comprises at least one first blind hole, the shape of which is such that when the plug is subjected to an elastic deformation that causes a ridge to appear between the top surface and the first side area of the plug, said ridge is removed by elastic deformation of said first blind hole.

The plug according to the first aspect of the invention makes it possible to resolve the aforementioned problems.

Indeed, the plug is composed of an elastically deformable material, for example an elastomer, which enables its simple and rapid placement in an attachment opening of appropriate size by elastic deformation. By choosing a plug of which the dimensions at rest are slightly greater than those of the attachment opening, the plug is inserted compressed into the attachment opening, then loses its tension after its introduction. The plug then completely blocks the attachment opening, preventing the infiltration of water at the level thereof, thus avoiding its corrosion. "At rest" is taken to mean the state in which the plug is found when it is not deformed. In addition, the dimensions and the material used make it possible to avoid disengagement of the plug during the operation of the turbomachine.

Furthermore, the first blind hole makes it possible to remove the ridges of material that form when the plug is in position in the attachment opening.

Moreover, the first blind hole makes it possible to remove the plug by using an appropriate removal tool, which makes the plug easy to remove and interchangeable.

Finally, no modification of the attachment opening and of the cup is required. Indeed, the plug inserted into the attachment opening suffices to block said attachment opening.

The plug according to the first aspect of the invention may also have one or more of the characteristics below, considered individually or according to all technically possible combinations thereof.

According to a non-limiting embodiment, the first blind hole includes an extremal blind portion inclined with respect to the first side area.

This configuration is such that when the plug is subjected to an elastic deformation that causes a ridge to appear between the top surface and the first side area of the plug, said ridge is removed by deformation of said first blind hole.

According to a non-limiting embodiment, the angle of inclination of the blind extremal portion with respect to the first side area is substantially comprised between 80 and 100 degrees, advantageously 90 degrees.

This is the optimal configuration to remove ridges of material of the plug.

According to a non-limiting embodiment, the first blind hole comprises an emerging extremal portion, said emerging extremal portion having a slot shape.

Thus, the tip of a removal tool introduced into the emerging extremal portion fits directly into the blind extremal portion of the first hole by rotation of the removal tool. It may be noted that the emerging extremal portion is advantageously oriented in the attachment opening in such a way that when the tip of the removal tool is wedged in the blind extremal portion, the plug is removable without the tool being hindered by the blade. Indeed, the tool then only has available a single degree of freedom: only rotations of the tool in a plane parallel to the blade are possible. This makes it possible to avoid the blade being damaged or does not constitute an obstacle for the removal of the plug.

According to a non-limiting embodiment, the top surface comprises a second blind hole, said second blind hole being diametrically opposite to the first blind hole.

The second blind hole is such that when the plug is subjected to an elastic deformation that causes a ridge to appear between the top surface and a second side area of the side wall diametrically opposite the first side wall, said ridge is removed by deformation of said second blind hole. Thus, ridges of material that appear following the insertion of the plug in the attachment opening are removed on either side of the plug.

According to a non-limiting embodiment, the first blind hole is positioned at the center of the top surface, and comprises an emerging cylindrical portion followed by a blind cylindrical portion, the blind extremal portion having a diameter greater than the diameter of the emerging extremal portion.

Thus, when the bottom surface and the top surface of the plug are parallel, the plug may be positioned in the attachment opening according to any orientation because it is symmetrical. This configuration makes it possible to avoid any error of placement during the mounting of the plug in the attachment opening. Since the blind extremal portion is of diameter greater than that of the emerging extremal portion, a wedging of the tip of the removal tool in the blind extremal portion is possible. Furthermore, the mold serving for the manufacture of such a plug is simple to produce.

According to a non-limiting embodiment, the side wall includes a succession of circumferential undulations perpendicular to the axial direction of said plug.

The undulations present on the side wall of the plug make it possible to improve the holding and the adherence of the plug in the attachment opening. In addition, such undulations make it possible to avoid ridges of material that could appear when the plug is held tightened in the attachment opening.

According to a non-limiting embodiment, the material forming the plug has a hardness substantially comprised between 30 and 80 shores.

Thus, the plug has a hardness such that said plug is not damaged by environmental stresses, in particular during the operation of the turbomachine. The hardness of the plug also allows it not to be broken or torn by the tightening means or by the removal tool during its removal from the attachment opening. Thanks to such a plug, the lifetime of the tightening means and the part comprising the attachment opening is increased.

According to a second aspect, the invention relates to a sealing system including:
 an attachment opening of a blade root, the attachment opening including a top portion,
 a plug according to the first aspect.

Root is equally well taken to mean the radially internal platform or the radially external platform of the blade 20 when it is in position in the turbomachine 10.

The plug is of external shape substantially complementary to the shape of the top portion of the attachment opening and of external dimensions at rest greater than the dimensions of said top portion.

Such a system makes it possible to realize a tightened mounting of the plug in the attachment opening, thus avoiding the penetration of water into the attachment opening and thus the corrosion of the tightening means or said attachment opening.

According to a non-limiting embodiment, the top surface of the plug is inclined with respect to the bottom surface such that when the plug is placed in the attachment opening, the top surface of the plug is in the geometric continuity of the blade root.

An advantage of such an asymmetrical geometry is to avoid any perturbation of the aerodynamic flow at the level of the root of the blade, the top surface of the plug being in the extension of that of the blade root.

According to a non-limiting embodiment, the top surface of the plug includes visual marks making it possible to place the plug in the top portion of the attachment opening according to a predetermined position.

Thus, since the plug is not symmetrical, the visual marks make it possible to help to place the plug correctly in the attachment opening and thus to avoid any error during mounting. In one embodiment, the visual marks comprise an arrow making it possible to indicate the direction in which the plug has to be placed, for example a direction in which the arrow points to the front of the engine. Such visual marks thus make it possible to ensure good aerodynamic flow at the level of the root of the blade.

According to a non-limiting embodiment, the system includes a tightening means comprising:
- a rod intended to be positioned in a bottom portion of the attachment opening,
- a head intended to be positioned in the top portion of the attachment opening and blocked by a shoulder between the bottom portion and the top portion, and the opening made on the bottom surface of the plug has a geometry substantially complementary to that of the head of the tightening means.

Such an opening makes it possible to guarantee the holding of the tightening means in the bottom surface of the plug thanks to a slightly tightened mounting while avoiding rotation of the plug during operation of the turbomachine. Indeed, during its operation, said turbomachine generates vibrations that propagate notably at the level of the guide vane. Furthermore, said opening also makes it possible to avoid ridges of material at the level of the opening.

According to a non-limiting embodiment, the system comprises a cup suited to be held against the shoulder of the attachment opening by the head of the tightening means, and in which:
- the rod of the tightening means is positioned in the bottom portion of the attachment opening,
- the cup is held against the shoulder of the attachment opening,
- the head of the tightening means is positioned and blocked in the top part of the attachment opening against the cup,
- the plug covers the head of the tightening means,
the bottom surface of the plug and the cup being separated by a non-zero distance.

A cup positioned in the blind boring of the attachment opening between the tightening means and the shoulder of said attachment opening makes it possible to avoid matting or marking of the parts. Indeed, when in operation, a turbomachine produces vibrations that propagate notably in the attachment opening and give rise to an area of friction between the tightening means and the shoulder. The cup makes it possible to avoid this friction and thereby increase the lifetime of the blade.

Such a system makes it possible to protect the attachment opening, the cup and the tightening means from all external aggressions such as ingestions of bits of gravel, sand, etc. Furthermore, the system makes it possible to conserve the lubricating grease placed between the rod of the tightening means and the lower portion of the attachment opening. In addition, the presence of a space between the bottom surface of the plug and the cup makes it possible to avoid the formation of ridges of material of the plug.

Finally, according to a third aspect, the invention relates to a blade of a guide vane comprising a root, said root of the blade comprising a sealing system according to the second aspect.

The invention will be better understood in the light of the description that follows and with reference to the figures, the list of which is given below.

BRIEF DESCRIPTION OF THE FIGURES

The figures are only presented for indicative purposes and are in no way limiting.

FIG. 4b, already described, schematically represents the assembled seal presented in FIG. 4a.

FIG. 5b is a side view of the elements of FIG. 5a.

FIG. 10a is a side view of a plug according to a second embodiment of the invention.

FIG. 10b shows a sealing system including the plug of FIG. 10a, positioned in an attachment opening of FIG. 2b.

FIG. 12 shows a top surface of a plug according to a fourth embodiment of the invention.

FIG. 13 schematically represents a sealing system including the plug of FIG. 12, positioned in an attachment opening of FIG. 2b.

DETAILED DESCRIPTION OF EMBODIMENTS OF THE INVENTION

Unless specified otherwise, a same element appearing in the different figures has a single reference.

Figure 1:
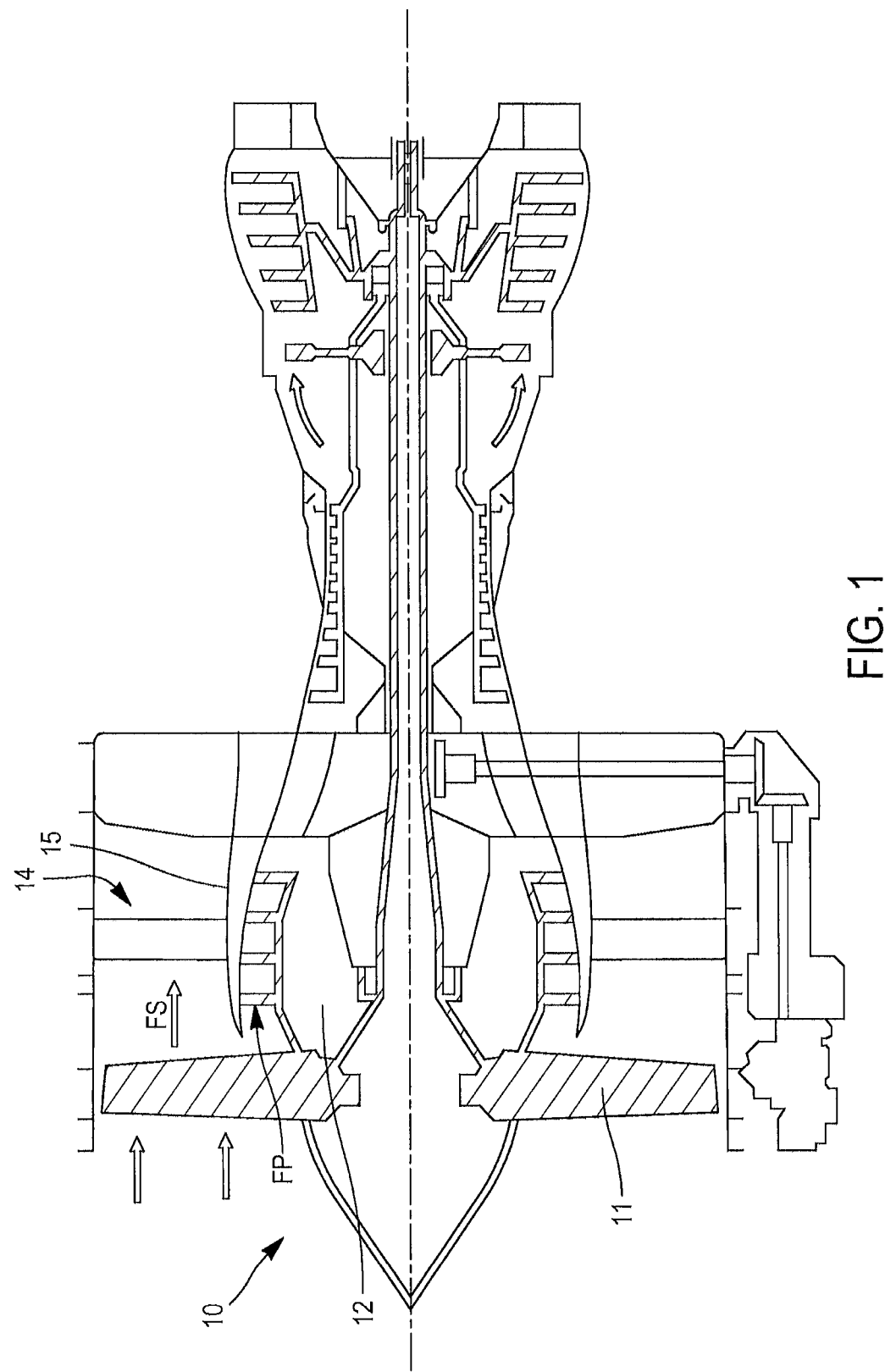
FIG. 1, already described, schematically represents a twin flow turbomachine comprising a guide vane.
Figure 2:
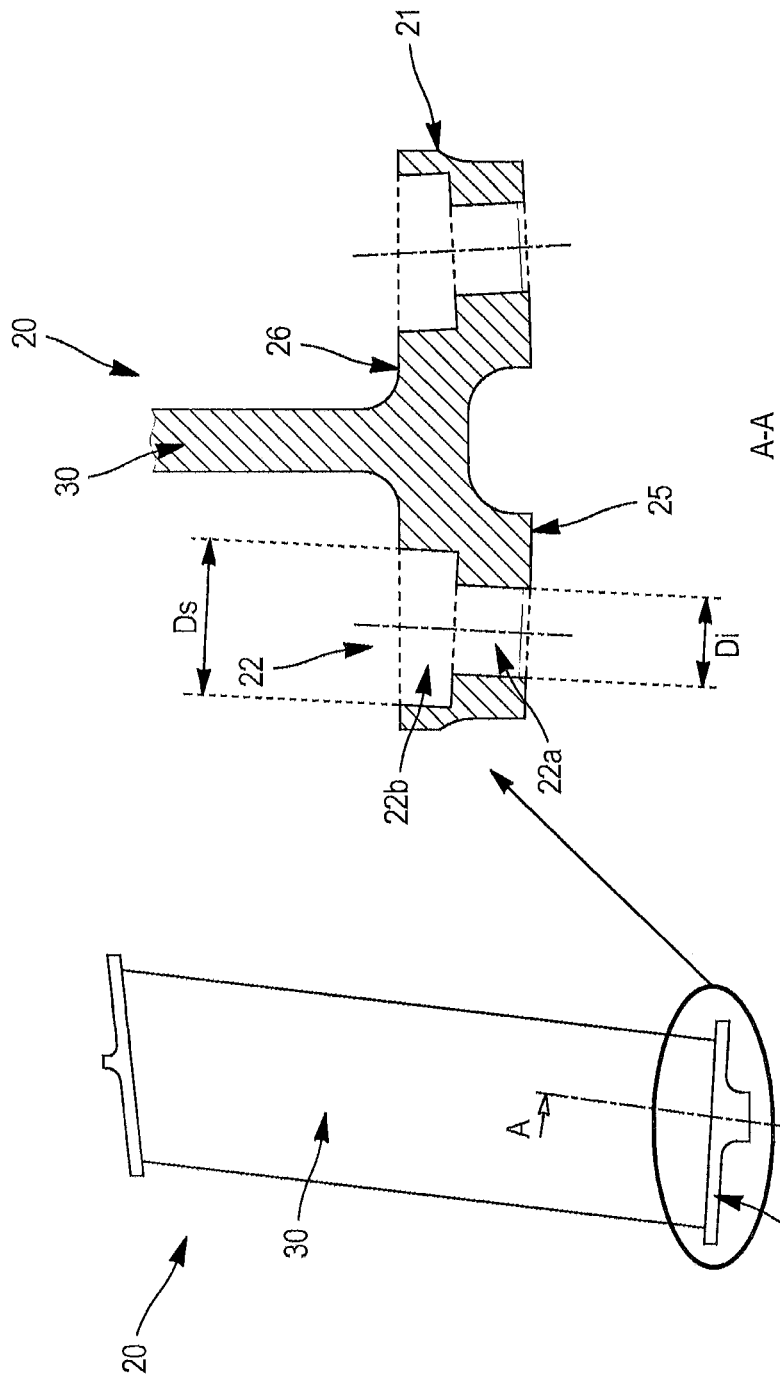
FIG. 2a, already described, schematically represents a blade of the guide vane presented in FIG. 1.
FIG. 2b, already described, is an enlargement of a root of the blade presented in FIG. 2 according to a sectional view, the root comprising two attachment openings.
Figure 3:
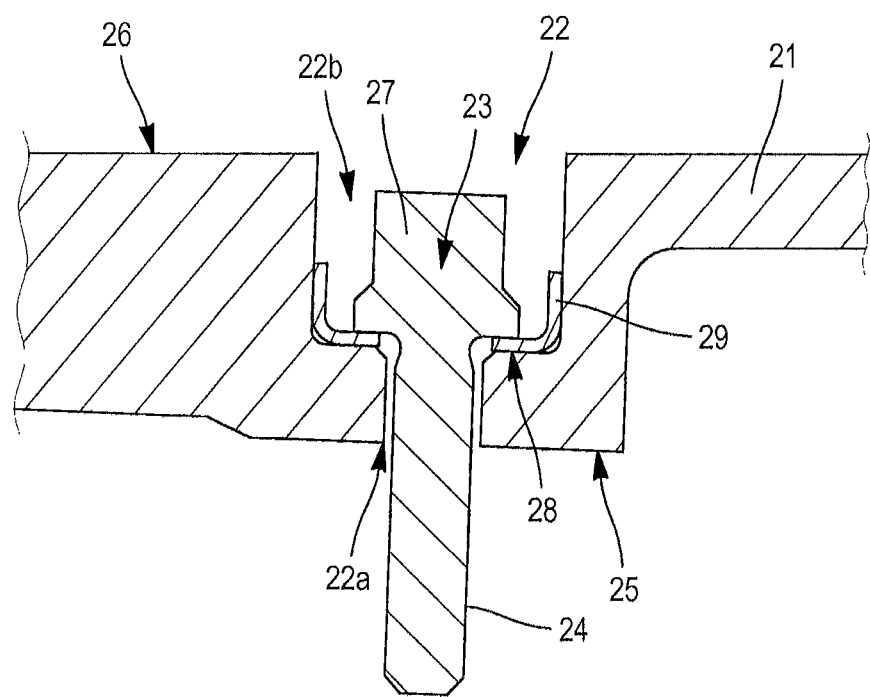
FIG. 3, already described, is an enlargement of an attachment opening of the blade root presented in FIG. 2b, in which are placed a tightening means and a cup.
Figure 4B:
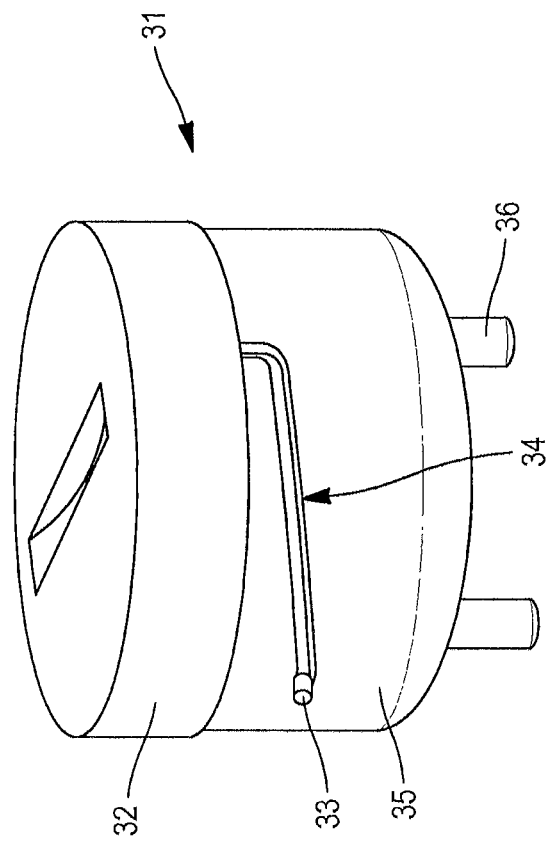
Figure 4A:
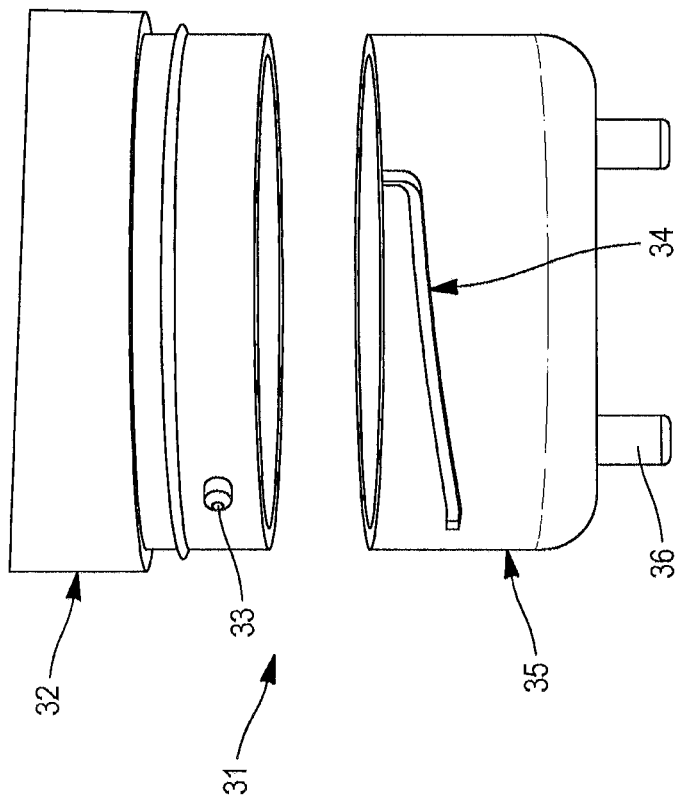
FIG. 4a, already described, is an exploded view of a seal of the prior art intended to be housed in an attachment opening presented in FIG. 2b.
Figure 5A:
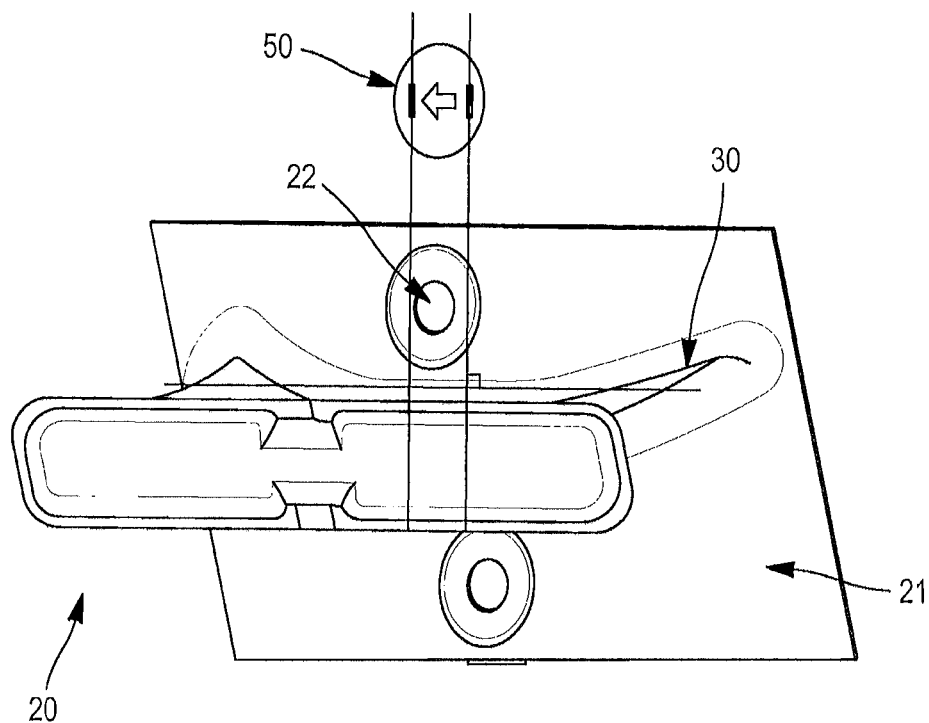
FIG. 5a is a top view of the blade root of FIG. 2b, and of a sealing system including a plug according to a first embodiment of the invention.
Figure 5B:
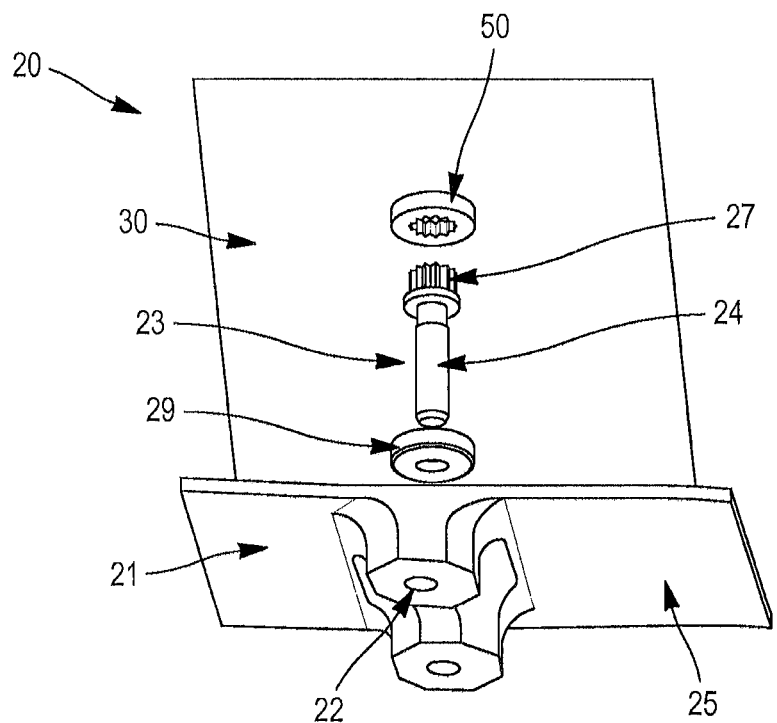

The invention relates to a plug for preventing the corrosion of an attachment opening of a guide vane blade root such as the attachment opening 22 of the root 21 of the blade 20 described previously and illustrated in FIG. 2b. FIGS. 5a and 5b show said root 21 in perspective according to two viewing angles: the top surface 26 of the root 21 is visible in FIG. 5a, whereas the bottom surface 25 of the root 21 is visible in FIG. 5b. As explained previously, the root 21 comprises two attachment openings 22 situated on either side of the body 30 of the blade 20. Each attachment opening 22 is intended to receive a tightening means as well as a cup, such as the tightening means 23 and the cup 29 evoked beforehand and illustrated in FIG. 3. Said tightening means 23 and said cup 29 are visible in FIG. 5b. In addition, each attachment opening 22 comprises a cylindrical bottom portion 22a emerging at the level of the bottom surface 25, and a cylindrical top portion 22b emerging at the level of the top surface 26. The top portion 22b has a diameter Ds greater than the diameter Di of the bottom portion 22a so as to form a shoulder 28 between the bottom portion 25 and the top portion 26 serving as support to the cup 29 and to the head 27 of the tightening means 23.

Figure 6:
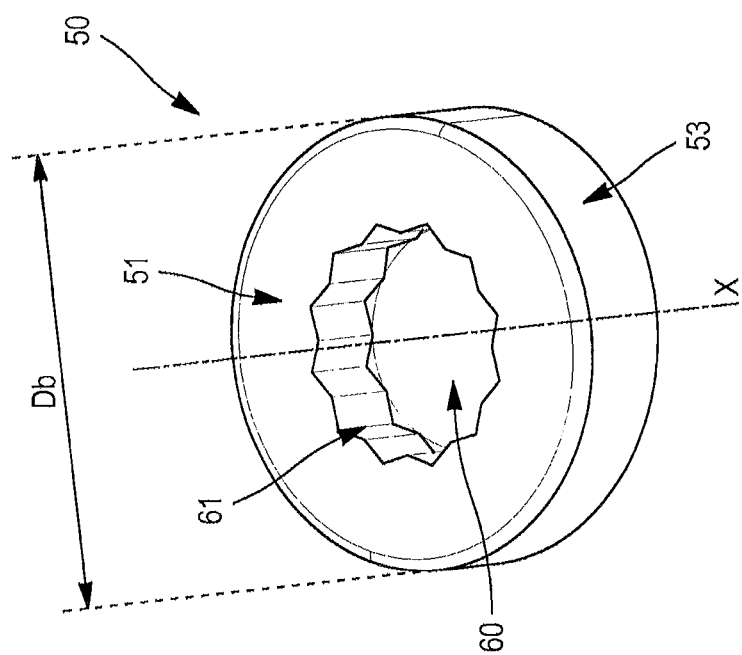
FIG. 6 shows a bottom surface of a plug of the system of FIGS. 5a and 5b.

FIGS. 5a and 5b also show a plug 50 according to a first embodiment. Said plug 50 is represented more precisely in FIGS. 6 and 7, in which are visible respectively a bottom surface 51 and a top surface 52 of said plug 50. The plug 50 is of external shape substantially complementary to the shape of the top portion 22b of the attachment opening 22 and of external dimensions at rest greater than the dimensions of said top portion 22b. Thus, the plug 50 is of substantially cylindrical general shape, and extends along an axial direction X. In other words, the plug 50 comprises a globally cylindrical side wall 53 extending along the axial direction X between its bottom surface 51 and its top surface 52.

However, the bottom surface 51 and the top surface 52 of the plug 50 are slightly inclined with respect to each other. In other words, the bottom surface 51 and the top surface 52 of the plug 50 are not parallel with respect to each other. This configuration is advantageous because the bottom surface 25 of the root 21 of the blade 20 and the shoulder 28 are not perfectly parallel with respect to each other. Placing the top surface 52 of the plug 50 in the extension of the top surface 26 of the root 21 of the blade 20, as is visible in FIG. 8a, makes it possible to avoid the flow of air flowing at the level of the top surface 26 of the root 21 of the blade 20 being perturbed by geometric discontinuities.

It may be noted that in other embodiments, the bottom surface 51 and the top surface 52 are substantially parallel with respect to each other, to the detriment of the quality of the aerodynamic flow in the secondary air flow. These configurations however make it possible to limit the risks of poor positioning of the plug 50 in the top portion 22b of the attachment opening 22.

Furthermore, the top surface 52 of the plug 50 includes a visual mark 54 making it possible to place the plug 50 in the top portion 22b of the attachment opening 22 according to a predetermined position. Indeed, when the top surface 52 and the bottom surface 51 of the plug 50 are not symmetrical, the visual mark 54 makes it possible to help to place the plug 50 correctly in the top portion 22b of the attachment opening 22 and thus to avoid any error during mounting. For example, the front or rear of the turbomachine is indicated by the tip of an arrow represented on the top surface 52 of the plug 50. It may be noted that such a visual mark 54 is optional.

Moreover, the plug 50 is composed of an elastically deformable material, for example an elastomer, which enables it to be held in a tightened position in the top portion 22b of the attachment opening 22. Indeed, in the rest state, that is to say in the state in which the plug 50 is not subjected to external stresses, the diameter Db of the plug 50 is slightly greater than the diameter Ds of the top portion 22b of the attachment opening 22. Thus, it is necessary to compress the plug 50 to introduce it into the top portion 22b of the attachment opening 22. When the plug 50 is positioned in the top portion 22b of the attachment opening 22, it seeks to lose its tension and press on the walls of the attachment opening 22, preventing the infiltration of water around the plug 50. The contact surface between the plug 50 and the walls of the top portion 22b of the attachment opening 22 is then optimal. It may be noted that the material forming the plug 50 is also impermeable, to avoid the introduction of water in the attachment opening 22 through the plug 50.

In addition, the plug 50 comprises an opening 60 made on its bottom surface 51. The opening 60 is intended to receive the head 27 of the tightening means 23. As is visible in FIG. 6, the opening 60 has imprints 61 intended to hug the shape of the head 27 of the tightening means 23. In other words, the opening 60 made on the bottom surface 51 of the plug 50 has a geometry substantially complementary to that of the head 27 of the tightening means 23. Thus, the plug 50 fits in perfectly, and advantageously according to a slightly tightened mounting, on the head 27 of the tightening means 23 until coming to abut against the extremal portion of said head 27. An optimal holding of the plug 50 on the head 27 of the tightening means 23 is thus assured, and rotations or movements of said plug 50 during the operation of the turbomachine are avoided. Furthermore, such a configuration makes it possible to avoid ridges of material which could appear with a mounting including a plug 50 of which the opening 60 on the bottom surface 51 would not be complementary to that of the head 27 of the tightening means 23.

It may be noted that in other embodiments, the opening 60 does not have imprints 61: the opening 60 is for example cylindrical. The mold for manufacturing the plug 50 is then simplified.

Figure 7:
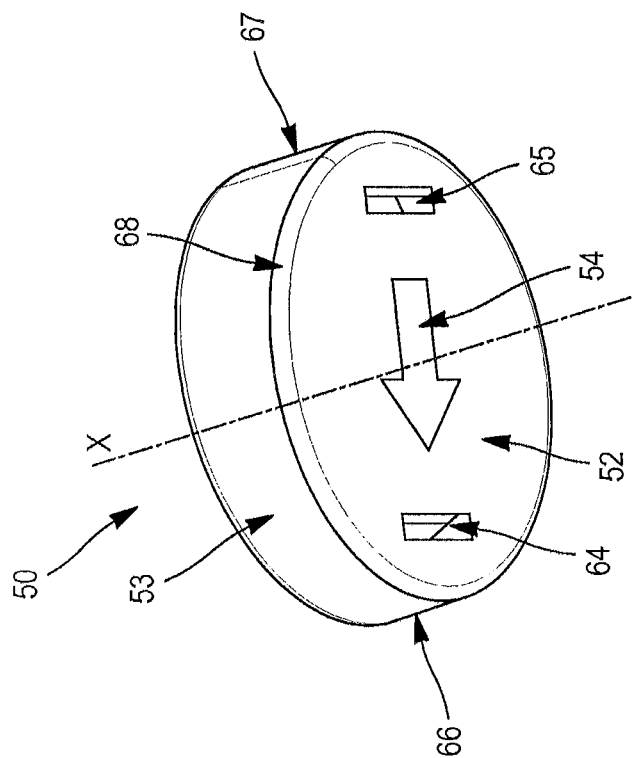
FIG. 7 shows a top surface of the plug of FIG. 6.
Figure 8A:
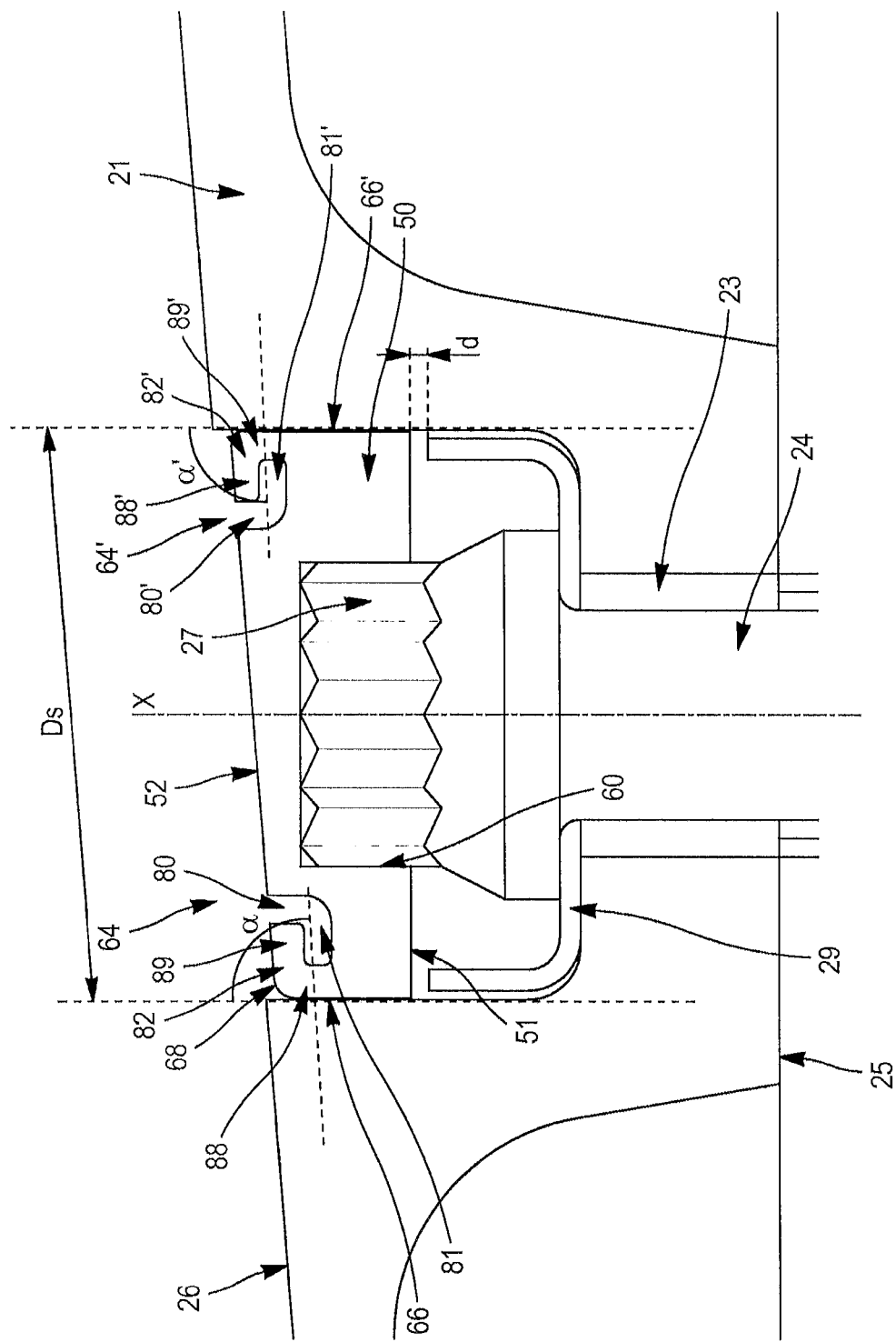
FIG. 8a shows the sealing system of FIGS. 5a and 5b being positioned in an attachment opening of FIG. 2b.

Furthermore, the plug 50 comprises a circumferential roundness 68 between the top surface 52 and the side wall 52, as is visible in FIGS. 7 and 8a. In addition, the plug 50 comprises a first blind hole 64 and a second blind hole 64' made on the top surface 52 of the plug 50 and diametrically opposite. The blind holes 64, 64' are useful for eliminating ridges of material that could appear on the plug 50 at the level of the roundness 68, more precisely in the free space between the roundness 68 and the circumference of the top portion 22b of the attachment opening 22. Providing a free space at this spot makes it possible to channel the ridges in order to avoid any excess of material which would create an irregularity of the aerodynamic flow in the secondary air flow.

The first blind hole 64 is of a shape such that when the plug 50 is subjected to an elastic deformation that causes a ridge to appear between the top surface 52 and a first side area 66 of the plug 50 situated near to said first blind hole 64 said ridge is removed by elastic deformation of said first blind hole 64. Similarly, the second blind hold 64' is of a shape such that when the plug 50 is subjected to an elastic deformation that causes a ridge to appear between the top surface 52 and a second side area 66' of the plug 50 situated near to said second blind hole 64' said ridge is removed by elastic deformation of said second blind hole 64'.

More precisely, with reference to FIG. 8a, the first blind hole 64 comprises an emerging extremal portion 80 on the top surface 52, and a blind extremal portion 81. The emerging extremal portion 80 extends parallel to the first side area 66 of the plug 50. Conversely, the blind extremal portion 81 is inclined with respect to the first side area 66 and in the direction of the first side area 66, of a first angle of inclination a substantially equal to 90 degrees. The first blind hole 64 thus delimits a first hook 82 of material, a first portion 88 of which extends along the first side area 66 and a second portion 89 extends along the top surface 52 of the plug. When the first hook 82 of material is subjected to a deformation creating a ridge at the intersection between the first portion 88 and the second portion 89, the second portion 89 pivots in the direction of the bottom surface 51 of the plug 50, penetrating into the first blind hole 64. The ridge is thereby removed.

Figure 8C:
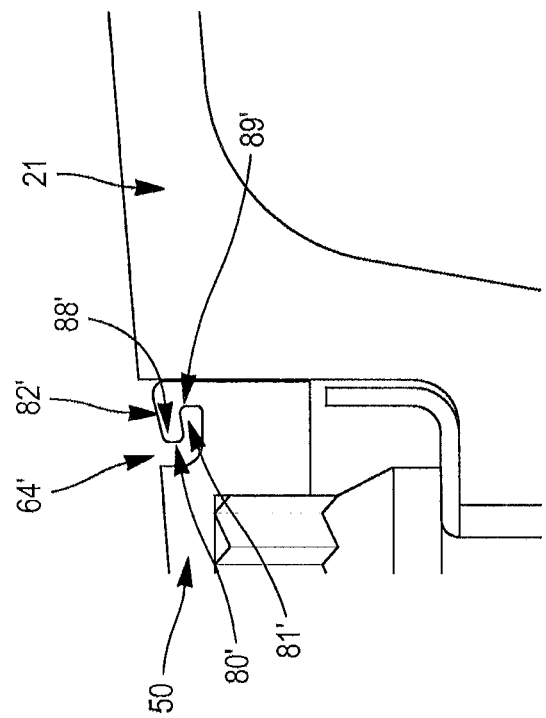
FIG. 8c shows the portion of the plug presented in FIG. 8b, the ridge having been eliminated.
Figure 8B:
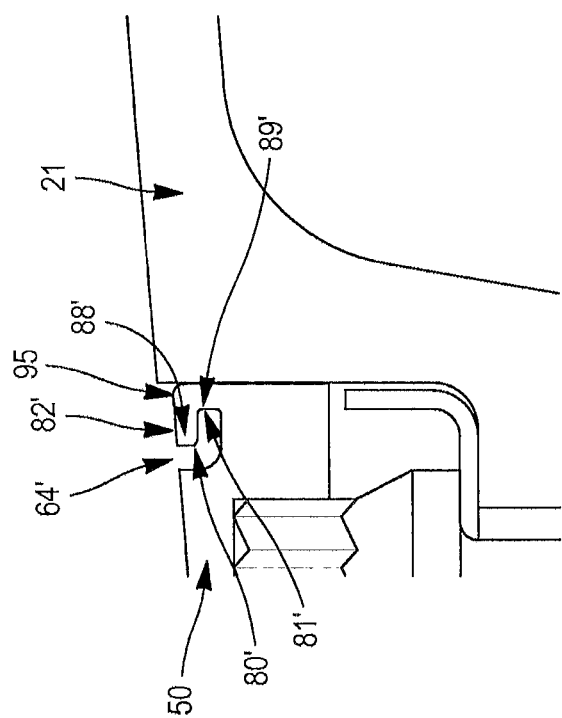
FIG. 8b is an enlargement of a portion of the plug shown in FIG. 8a, being subjected to an elastic deformation forming a ridge.

Similarly, with reference to FIG. 8a, the second blind hole 64' comprises an emerging extremal portion 80' on the top surface 52, and a blind extremal portion 81'. The emerging extremal portion 80' extends parallel to the second side area 66' of the plug 50. Conversely, the blind extremal portion 81' is inclined with respect to the second side area 66' and in the direction of the second side area 66', of a second angle of inclination a' substantially equal to 90 degrees. The second blind hole 64' thus delimits a second hook 82' of material of which a first portion 88' extends along the second side area 66' and a second portion 89' extends along the top surface 52 of the plug 50. With reference to FIG. 8b, when the second hook 82' of material is subjected to a deformation creating a ridge 95 at the intersection between the first portion 88' and the second portion 89', the second portion 89' pivots in the direction of the bottom surface 51 of the plug 50, penetrating into the second blind hole 64', as is shown in FIG. 8c. The ridge 95 is thereby removed.

It may be noted that in the embodiment presented in FIG. 8a, the first blind hole 64 and the second blind hole 64' are substantially diametrically opposite each other: the first blind hole 64 and the second blind hole 64' are substantially symmetrical along a central symmetry of axis X and of angle 180 degrees. The ridges of material are thereby removed on either side of the plug 50.

Figure 9A:
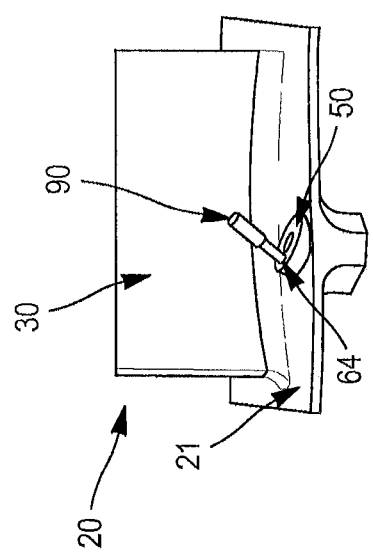
FIGS. 9a, 9b and 9c schematically represent the steps of extraction of the plug of FIG. 5a by a removal tool.
Figure 9B:
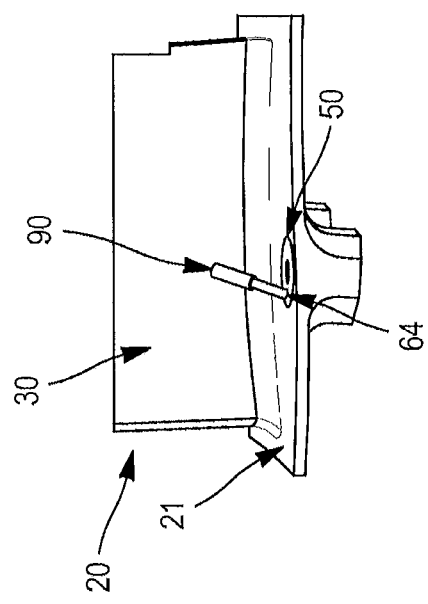
Figure 9C:
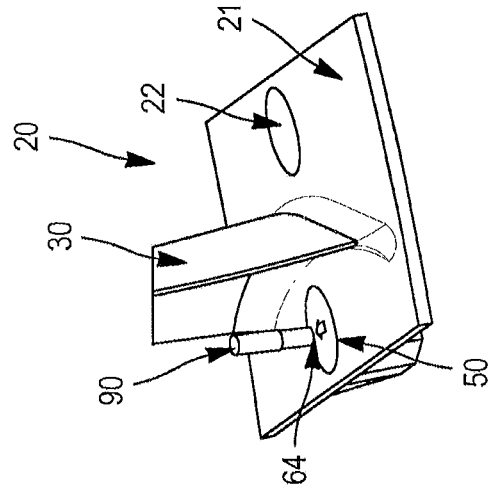

Moreover, the blind holes 64, 64' are useful for removing the plug 50 via a removal tool 90 (shown in FIGS. 9a, 9b and 9c). To remove the plug 50 from the top portion 22b of the attachment opening 22, the removal tool 90 is inserted into the emerging extremal portion of a blind hole 64, 64' and wedged in the blind extremal portion 81, 81', as shown in FIG. 9b. A rotation of the removal tool 90 then makes it possible to remove the plug 50. It may be seen in FIG. 7 that the emerging extremal portion 80, 80' is slot shaped. Such a shape makes it possible to place correctly the tip of the removal tool 90 (such as a flat-blade screwdriver) so that the emplacement of the blind extremal portion 81, 81' is easy to locate, and thereby facilitate the removal of the plug 50. Furthermore, by virtue of the configuration of the blind holes 64, 64', the removal tool 90 only has available a single degree of freedom. Thus, by placing the plug 50 in the attachment opening 22 in such a way that the slot extends orthogonally to the body 30 of the blade 20, the removal tool 90 can only carry out rotations in a plane parallel to the body 30 of the blade 22 during removal of the plug 50. The body 30 of the blade 22 thus does not constitute an obstacle for the removal of the plug 50, and does not risk being damaged.

It may be noted that in other embodiments, the emerging extremal parts 80, 80' of the first and/or second blind hole(s) 64, 64' have a shape different to that of a slot, for example a cylindrical or arc of circle shape, at the level of their emerging end(s). In other embodiments, the plug 50 has on its top surface 52 a larger number of blind holes 64, 64', for example three or four, in order to eliminate ridges appearing in different places of the side wall 53 of the plug 50.

In other embodiments, the emerging extremal portion 80, 80' and the blind extremal portion 81, 81' of the first blind hole 64 and/or the second blind hole 64' are in the continuity of each other, that is to say oriented along a same and unique inclination. It is important that the angle of this inclination enables a sufficient lever arm to remove the plug 50 using the removal tool 90, and enables the first blind hole 64 and/or second blind hole 64' to deform in order to absorb potential ridges. It is also important that the configurations of the first blind hole 64 and second blind hole 64' are simple to avoid making the production of the plug more complex.

FIG. 9 illustrates an embodiment in which the plug 50 has successive undulations 92 on its side wall 53, said undulations 92 being circumferential and substantially perpendicular to the axial direction X of said plug 50. Such undulations 92 make it possible to improve the holding and the adherence of the plug 50 in the top portion 22b of the attachment opening 22. FIG. 10 shows the plug 50 in position in the top portion 22b of the attachment opening 22.

It may be noted that the number of undulations 92 differs according to the embodiments, as a function of the size of the plug 50 for example.

Figure 11:
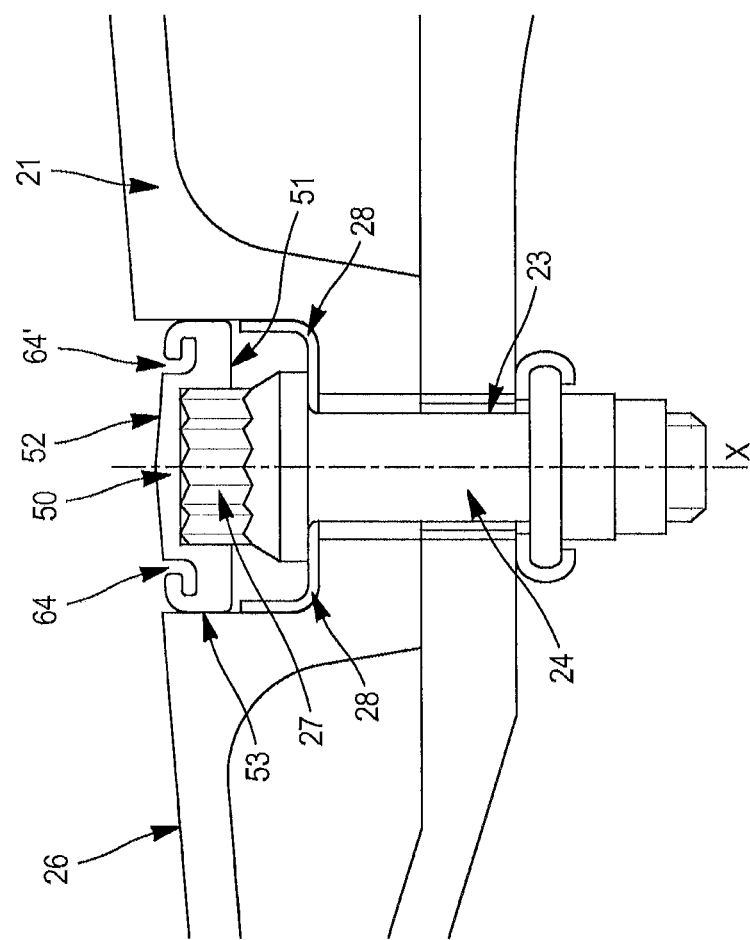
FIG. 11 represents a sealing system including a plug according to a third embodiment of the invention, positioned in an attachment opening of FIG. 2b.

FIG. 11 represents another embodiment of the plug 50 according to the invention, in position in the top portion 22b of the attachment opening 22. The top surface 52 of said plug 50 is curved. Such a configuration makes it possible to avoid any error of placement during the mounting of the plug 50 in the top portion 22b of the attachment opening 22 and does not necessitate adding visual marks 54 on the top surface 52 of the plug 50. However, aerodynamic flow in the air flow is deteriorated due to the geometric discontinuity between the plug 50 and the top surface 26 of the root 21 of the blade 20.

FIGS. 12 and 13 present an alternative embodiment of the plug 50 according to the invention. The plug 50 only comprises one blind hole 94, at the center of the top face 52 of the plug 50. Said blind hole 94 includes two portions: an emerging extremal portion 97 on the top surface 52, and a blind extremal portion 96. Said portions 97, 96 are of cylindrical shape, the emerging extremal portion 97 having a diameter greater than the diameter of the blind extremal portion 96. It is thus possible to wedge the tip of the removal tool 90 along any direction in the blind extremal portion 96. Errors of placement of the plug 50 in the top portion 22b of the attachment opening 22 are also reduced, given that the plug 50 is symmetrical. In addition, such a plug 50 can be produced with a simple manufacturing mold. However, aerodynamic flow in the air flow is deteriorated due to the geometric discontinuity between the plug 50 and the top surface 26 of the root 21 of the blade 20.

The invention claimed is:

1. A plug for preventing the corrosion of a top portion of an attachment opening, comprising:
   a bottom surface including an opening for receiving a head of a tightening device,
   a top surface,
   a substantially cylindrical side wall extending along an axial direction between the bottom surface and the top surface, said side wall including a first side area, wherein:
   the plug is formed of an elastically deformable material, and has a diameter at rest and an elasticity enabling said plug to block and to be held in the top portion of the attachment opening by elastic deformation, the top surface comprises at least one first blind hole having a shape that is deformable when the plug is subjected to an elastic deformation, the at least one first blind hole is positioned substantially at the center of the top surface, and comprises a cylindrical emerging extremal portion followed by a cylindrical blind extremal portion, the blind extremal portion having a diameter greater than the diameter of the emerging extremal portion.

2. The plug according to claim 1, wherein the blind extremal portion is inclined with respect to the first side area.

3. The plug according to claim 1, wherein the emerging extremal portion has a slot shape.

4. The plug according to claim 1, wherein the top surface comprises a second blind hole.

5. The plug according to claim 1, wherein the side wall includes a succession of circumferential undulations substantially perpendicular to the axial direction of said plug.

6. A sealing system including:
an attachment opening of a root of a blade, the attachment opening including a top portion, and
a plug for preventing the corrosion of the top portion of the attachment opening, the plug comprising
a bottom surface including an opening for receiving a head of a tightening device,
a top surface,
a substantially cylindrical side wall extending along an axial direction between the bottom surface and the top surface, said side wall including a first side area, wherein:

the plug is formed of an elastically deformable material, and has a diameter at rest and an elasticity enabling said plug to block and to be held in the top portion of the attachment opening by elastic deformation, the top surface comprises at least one first blind hole having a shape that is deformable when the plug is subjected to an elastic deformation, and wherein the plug is of external shape substantially complementary to the shape of the top portion of the attachment opening and of diameter at rest greater than the diameter of said top portion.

7. The sealing system according to claim 6, wherein the top surface of the plug is inclined with respect to the bottom surface such that when the plug is placed in the top portion of the attachment opening, the top surface of the plug is in the geometric continuity of the root of the blade.

8. The sealing system according to claim 7, wherein the top surface of the plug includes visual marks making it possible to place the plug in the top portion of the attachment opening according to a predetermined position.

9. The sealing system according to claim 6, further comprising a tightening device comprising:
a rod configured to be positioned in a bottom portion of the attachment opening,
a head configured to be positioned in the top portion of the attachment opening and blocked by a shoulder between the bottom portion and the top portion,
the opening made on the bottom surface of the plug having a geometry substantially complementary to that of the head of the tightening device.

10. A blade of a guide vane comprising a root, said blade comprising a sealing system according to claim 6.

* * * * *